(12) United States Patent
Li et al.

(10) Patent No.: US 11,271,274 B2
(45) Date of Patent: Mar. 8, 2022

(54) SECONDARY BATTERY

(71) Applicant: QINGHAI CONTEMPORARY AMPEREX TECHNOLOGY LIMITED, Xining (CN)

(72) Inventors: Zhiling Li, Xining (CN); Hui Li, Xining (CN); Tingting Zhang, Xining (CN); Yong Zhou, Xining (CN); Jianing He, Xining (CN); Weiqing Wu, Xining (CN); Baiqing Li, Xining (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/137,111

(22) Filed: Dec. 29, 2020

(65) Prior Publication Data

US 2021/0119306 A1 Apr. 22, 2021

Related U.S. Application Data

(63) Continuation of application No. 16/732,172, filed on Dec. 31, 2019, now Pat. No. 11,196,131.

(30) Foreign Application Priority Data

Mar. 1, 2019 (CN) .......................... 201910155674.1

(51) Int. Cl.
*H01M 50/538* (2021.01)
*H01M 10/04* (2006.01)
*H01M 50/449* (2021.01)

(52) U.S. Cl.
CPC ..... *H01M 50/538* (2021.01); *H01M 10/0431* (2013.01); *H01M 10/0459* (2013.01); *H01M 50/449* (2021.01)

(58) Field of Classification Search
CPC ............... H01M 2/0277; H01M 2/029; H01M 2/045916; H01M 2/1686; H01M 2/22;
(Continued)

(56) References Cited

U.S. PATENT DOCUMENTS 8,679,675 B2 * 3/2014 Kwon ............... H01M 10/0587
429/186
9,023,509 B2 * 5/2015 Cho ..................... H01M 50/116
429/162

(Continued)

FOREIGN PATENT DOCUMENTS

EP 2398088 A2 12/2011
EP 2410594 A1 1/2012
(Continued)

OTHER PUBLICATIONS

Engineering ToolBox, (2003). Young's Modulus—Tensile and Yield Strength for common Materials. [online] Available at: https://www.engineeringtoolbox.com/young-modulus-d_417.html [Accessed Dec. 16, 2020]. (Year: 2003).*

(Continued)

*Primary Examiner* — Maria Laios
*Assistant Examiner* — Adam J Francis
(74) *Attorney, Agent, or Firm* — Morgan, Lewis & Bockius LLP

(57) ABSTRACT

The present disclosure provides a secondary battery, which includes an electrode assembly, a case, a cap assembly and a first insulating tape. The electrode assembly comprises an electrode unit. The electrode unit comprises a positive electrode plate, a negative electrode plate and a separator. The electrode unit is a winding structure and in a flat shape, and an outermost turn of the negative electrode plate is positioned at an outer side of an outermost turn of the positive electrode plate. The case comprises a first side wall (Continued)

and an accommodating cavity, the electrode assembly is accommodated in the accommodating cavity, the case is electrically connected with the positive electrode plate, and the cap assembly is connected with the case. The first insulating tape is positioned between the electrode assembly and the first side wall and closely attached to an outer surface of the electrode assembly.

19 Claims, 5 Drawing Sheets

(58) Field of Classification Search
CPC .. H01M 2/263; H01M 50/538; H01M 50/449; H01M 10/0459; H01M 10/647; H01M 50/105; H01M 50/178; H01M 50/211; H01M 50/553; H01M 50/583; H01M 50/499; H01M 10/0431; H01M 10/045
See application file for complete search history.

(56) References Cited

U.S. PATENT DOCUMENTS

| | | | |
|---|---|---|---|
| 2005/0233214 A1* | 10/2005 | Marple | H01M 4/581 429/221 |
| 2010/0035132 A1 | 2/2010 | Park | |
| 2011/0064996 A1 | 3/2011 | Park | |
| 2013/0164574 A1* | 6/2013 | Kim | H01M 50/572 429/61 |
| 2014/0106207 A1* | 4/2014 | Kim | H01M 10/0422 429/174 |
| 2015/0104684 A1 | 4/2015 | Kim et al. | |
| 2017/0141427 A1 | 5/2017 | Cho et al. | |
| 2018/0375070 A1* | 12/2018 | Wakimoto | H01M 4/583 |

FOREIGN PATENT DOCUMENTS

| | | | |
|---|---|---|---|
| EP | 2608293 A1 | 6/2013 | |
| JP | 2013080563 A * | 5/2013 | Y02E 60/10 |

OTHER PUBLICATIONS

English Translation of JP2013080563A, Laminate-type secondary battery, Sanyo electric CO., Norie Mantoku, May 2, 2013 (Year: 2013).*

Engineering ToolBox, (2003), Young's Modulus—Tesile and Yield Strength for common Materials, [online] available at: https://www.engineringtoolbox.com/young-modulus_417.html, accessed Dec. 16, 2020, (Year: 2003), 13 pgs.

Li, Office Action, U.S. Appl. No. 16/732,172, dated Dec. 22, 2020, 17 pgs.

Qinghai Contemporary Amperex Technology Limited, Extended European Search Report, EP 19219989.1, dated May 8, 2020, 8 pgs.

Li, Final Office Action, U.S. Appl. No. 16/732,172, dated May 24, 2021, 18 pgs.

* cited by examiner

SECONDARY BATTERY

CROSS-REFERENCE TO RELATED APPLICATIONS

This application is a continuation application of U.S. patent application Ser. No. 16/732,172, entitled "SECONDARY BATTERY" and filed on Dec. 31, 2019, which claims priority to Chinese Patent Application No. 201910155674.1, entitled "SECONDARY BATTERY" and filed with the State Intellectual Property Office of the People's Republic of China on Mar. 1, 2019, all of which are incorporated herein by reference in their entirety.

TECHNICAL FIELD

The present disclosure relates to the field of battery, and particularly relates to a secondary battery.

BACKGROUND

A secondary battery comprises an electrode assembly and a case accommodating the electrode assembly. The existing case is generally conducted with a positive electrode of the electrode assembly, so as to make the case kept at high potential to avoid corrosion. However, the case will increase a risk of short circuit of the secondary battery under the conduction of the case. For example, in the process of assembling the secondary battery, metal foreign materials will be remained on an outer surface of the electrode assembly. In the working process, the electrode assembly expands and presses the case in the later stage of the cycle-life, at this time, the metal foreign materials are easy to pierce a separator of the electrode assembly, and conduct a negative electrode of the electrode assembly to the case, thereby leading to short circuit and resulting in safety risk.

SUMMARY

A secondary battery in accordance with some embodiments comprises an electrode assembly, a case, a cap assembly and a first insulating tape. The electrode assembly comprises an electrode unit, the electrode unit is provided as one or plurality in number. The electrode unit comprises a positive electrode plate, a negative electrode plate and a separator provided between the positive electrode plate and the negative electrode plate. The electrode unit is a winding structure and in a flat shape, and an outermost turn of the negative electrode plate is positioned at an outer side of an outermost turn of the positive electrode plate. The case comprises a first side wall and an accommodating cavity, the electrode assembly is accommodated in the accommodating cavity, the case is electrically connected with the positive electrode plate, and the cap assembly is connected with the case. The first insulating tape is positioned between the electrode assembly and the first side wall and closely attached to an outer surface of the electrode assembly.

Figure 1:
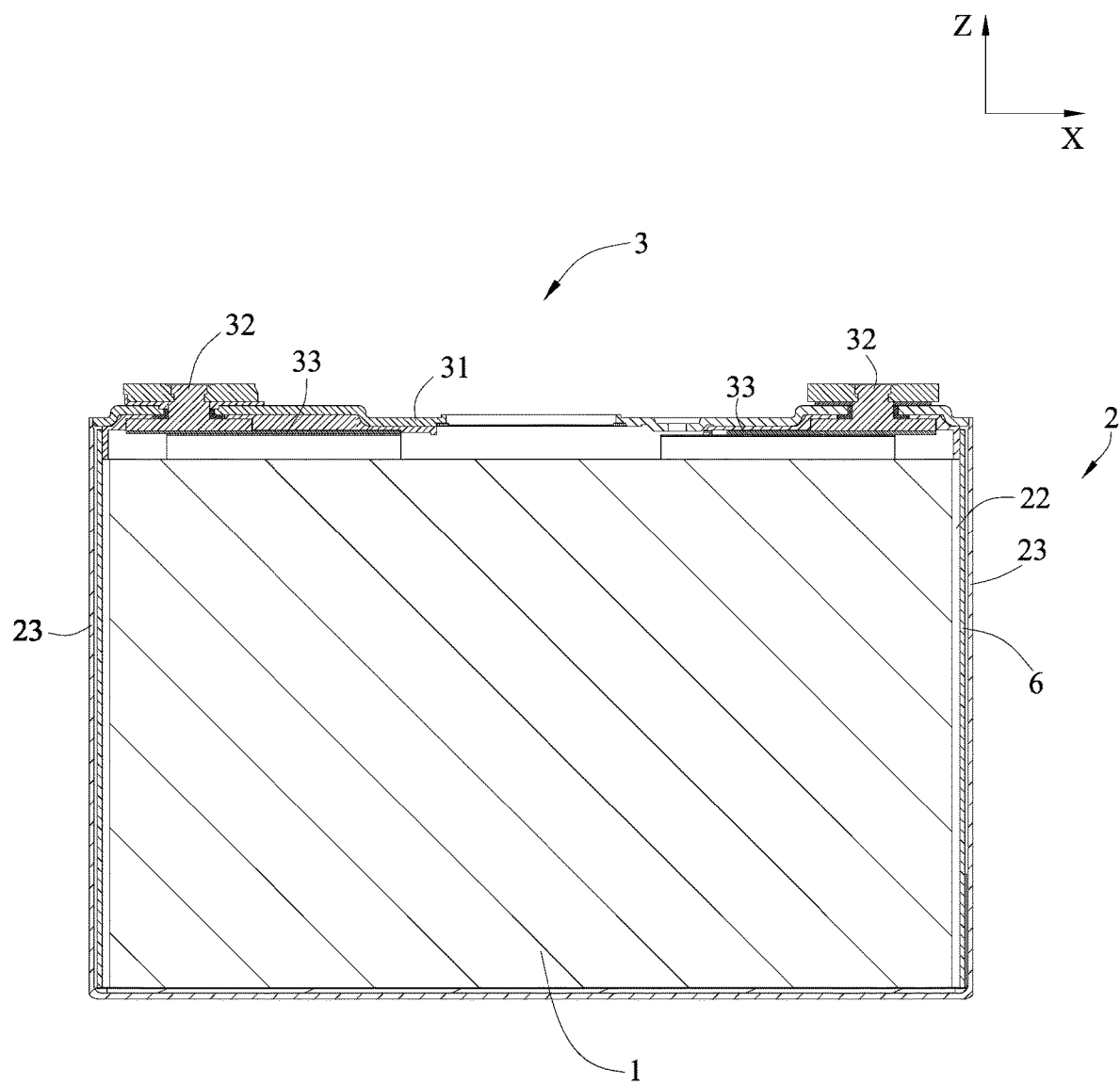
FIG. 1 is a schematic view of a secondary battery according to the present disclosure.

Reference numerals in figures are represented as follows:
1 electrode assembly
11 electrode unit
111 positive electrode plate
$111c$ positive electrode current collector
$111d$ positive electrode active material layer
112 negative electrode plate
$112c$ negative electrode current collector
$112d$ negative electrode active material layer
113 separator
$11a$ narrow surface
$11b$ main surface
12 end surface
13 first surface
14 second surface
2 case
21 first side wall
22 accommodating cavity
23 second side wall
3 cap assembly
31 cap plate
32 electrode terminal
33 connecting piece
4 first insulating tape
41 base body
42 adhesive layer
$4c$ first edge
$4d$ second edge
5 second insulating tape
6 protecting member
X width direction
Y thickness direction
Z length direction

DETAILED DESCRIPTION

To make the object, technical solutions and advantages of the present disclosure more apparent, hereinafter the present disclosure will be further described in detail in combination with the accompanying figures and the embodiments. It should be understood that the specific embodiments described herein are merely used to explain the present disclosure but are not intended to limit the present disclosure.

In the description of the present disclosure, unless otherwise specifically defined and limited, the terms "first", "second", and "third" are only used for illustrative purposes and are not to be construed as expressing or implying a relative importance. The term "plurality" is two or more. Unless otherwise defined or described, the term "connect" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

In the description of the present disclosure, it should be understood that spatially relative terms, such as "above", "below" and the like, are described based on orientations illustrated in the figures, but are not intended to limit the embodiments of the present disclosure. Hereinafter the present disclosure will be further described in detail in combination with the exemplary embodiments and the figures.

Figure 2:
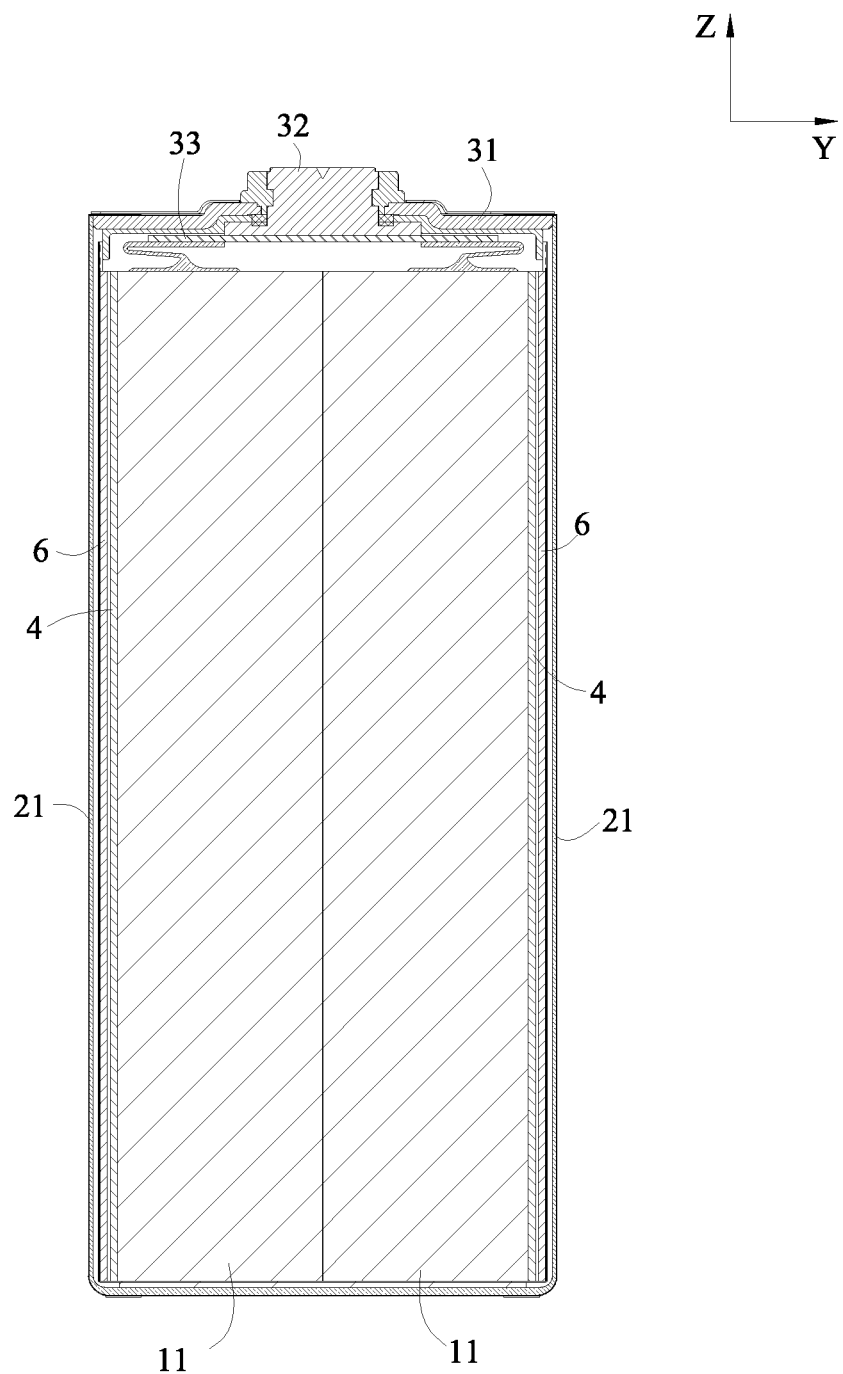
FIG. 2 is another schematic view of the secondary battery according to the present disclosure.

Referring to FIG. 1 and FIG. 2, a secondary battery of the present disclosure comprises an electrode assembly 1, a case 2, a cap assembly 3 and a first insulating tape 4.

Figure 4:
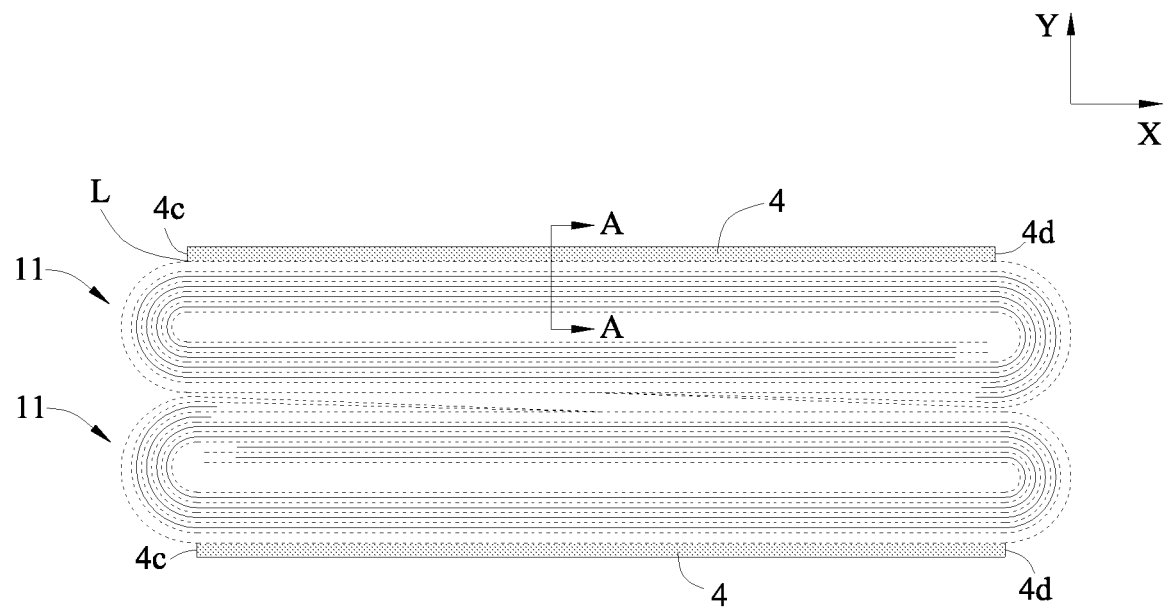
FIG. 4 is a cross sectional view of FIG. 3.
Figure 5:
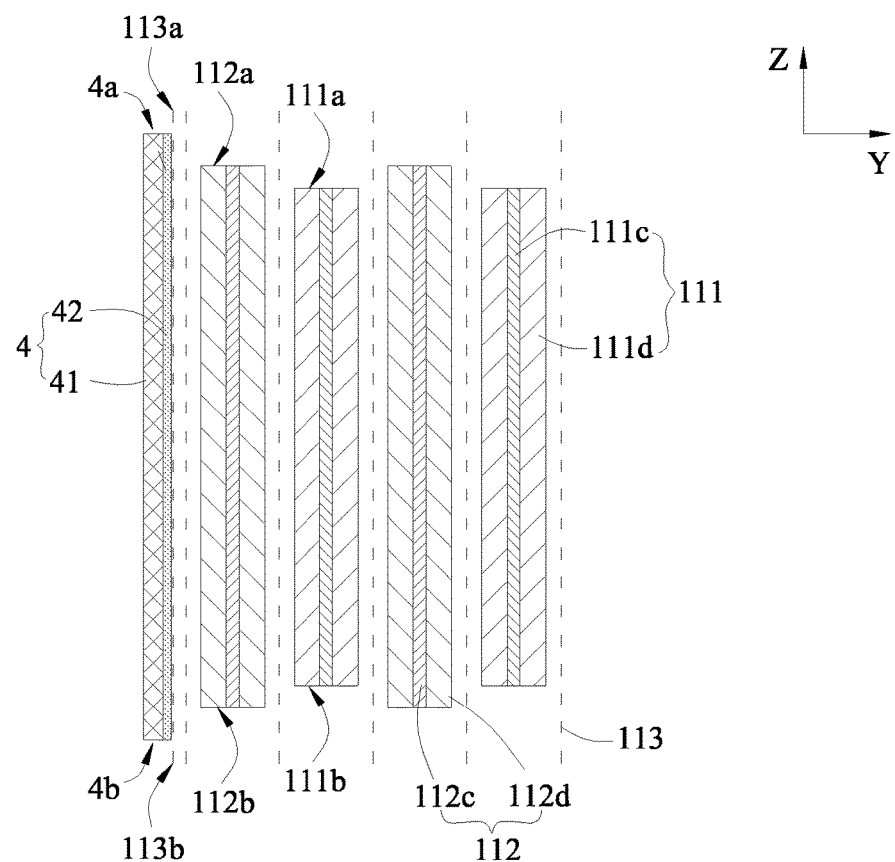
FIG. 5 is a cross sectional view taken along a line A-A of FIG. 4.
Figure 6:
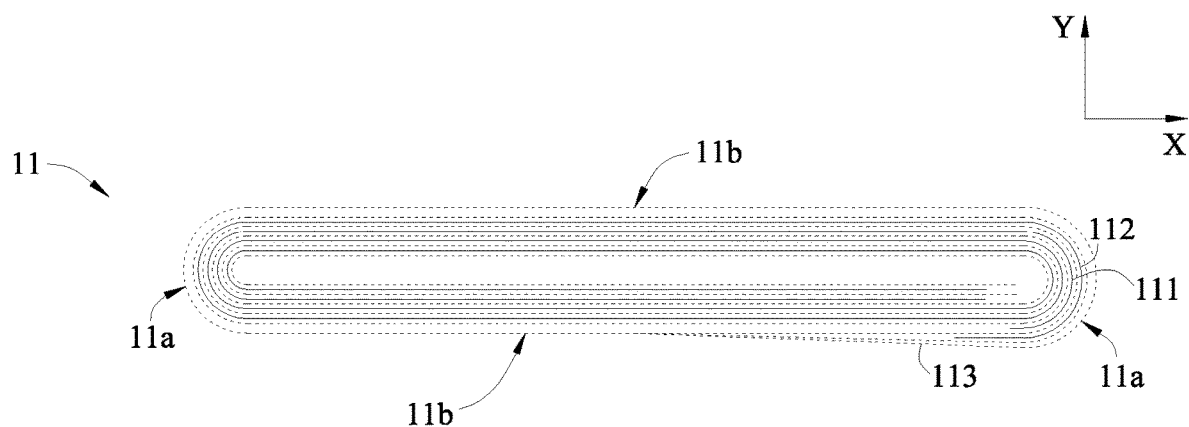
FIG. 6 is a schematic view of an electrode unit of FIG. 4.

The electrode assembly 1 comprises an electrode unit 11, the electrode unit 11 is provided as one or plurality in number; in some embodiments, the electrode unit 11 is provided as plurality in number, and the plurality of electrode units 11 are arranged in a thickness direction Y. Referring to FIG. 4 to FIG. 6, the electrode unit 11 comprises a positive electrode plate 111, a negative electrode plate 112 and a separator 113 provided between the positive electrode plate 111 and the negative electrode plate 112. The electrode unit 11 is formed by spirally winding the positive electrode plate 111, the negative electrode plate 112 and the separator 113, and the electrode unit 11 forms a flat structure by pressing.

The positive electrode plate 111 comprises a positive electrode current collector 111c and a positive electrode active material layer 111d coated on two surfaces of the positive electrode current collector 111c, the positive electrode current collector 111c is an aluminum foil in some embodiments, and the positive electrode active material layer 111d comprises lithium manganese oxide or lithium iron phosphate. The positive electrode current collector 111c has a positive electrode blank region which is not covered by the positive electrode active material layer 111d. The negative electrode plate 112 comprises a negative electrode current collector 112c and a negative electrode active material layer 112d coated on two surfaces of the negative electrode current collector 112c, the negative electrode current collector 112c is a copper foil in some embodiments, the negative electrode active material layer 112d comprises graphite or silicon. The negative electrode current collector 112c has a negative electrode blank region which is not covered by the negative electrode active material layer 112d.

In the working process of the secondary battery, a lithium-ion in the positive electrode active material layer 111d needs to pass through the separator 113 and intercalate into the negative electrode active material layer 112d. When winding, if an outermost turn of the negative electrode plate 112 of the electrode unit 11 is positioned at an inner side of an outermost turn of the positive electrode plate 111 of the electrode unit 11, the lithium-ion in the outermost turn of the positive electrode plate 111 cannot intercalate into the negative electrode plate 112, thereby leading to precipitate problem of lithium. Therefore, in the electrode unit 11 of the present disclosure, the outermost turn of the negative electrode plate 112 is positioned at an outer side of the outermost turn of the positive electrode plate 111. Certainly, in order to ensure insulation, an outermost turn of the separator 113 of the electrode unit 11 is positioned at an outer side of the outermost turn of the negative electrode plate 112.

Referring to FIG. 6, the electrode unit 11 comprises two narrow surfaces 11a and two main surfaces 11b. The two main surfaces 11b are respectively positioned at two ends of the electrode unit 11 in the thickness direction Y, and each main surface 11b is a basically flat surface. The two narrow surfaces 11a are respectively positioned at two ends of the electrode unit 11 in a width direction X, at least a part of the narrow surface 11a is an arc surface, and each narrow surface 11a connects the two main surfaces 11b. An area of the main surface 11b is larger than an area of the narrow surface 11a. The thickness direction Y and the width direction X are perpendicular to each other; the thickness direction Y and the width direction X are perpendicular to a winding axis of the electrode unit 11. In addition, an outermost turn of the electrode unit 11 is the separator 113, so the narrow surface 11a and the main surface 11b respectively are different parts of an exposed surface of the separator 113.

The case 2 forms an accommodating cavity 22 inside, to accommodate the electrode assembly 1 and an electrolyte. An opening is formed at an end of the accommodating cavity 22, and the electrode assembly 1 can be positioned into the accommodating cavity 22 via the opening. The case 2 is made of conductive metal in some embodiments, such as aluminum, aluminum alloy or the like.

The case 2 is prismatic in some embodiments. Specifically, the case 2 comprises a first side wall 21, a second side wall 23 and a bottom wall, the first side wall 21 is provided as two in number and the two first side walls 21 are respectively provided at two sides of the electrode assembly 1 in the thickness direction Y; the second side wall 23 is provided as two in number and the two second side walls 23 are respectively provided at two sides of the electrode assembly 1 in the width direction X; the two first side walls 21 and the two second side walls 23 are connected together to form an approximate rectangle frame. The bottom wall is provided at a lower side of the first side walls 21 and the second side walls 23 and connected with the first side walls 21 and the second side walls 23; the accommodating cavity 22 of the case 2 is surrounded by the bottom wall, the two first side walls 21 and the two second side walls 23. Compared to the second side wall 23, the first side wall 21 has a larger area.

Referring to FIG. 1, the cap assembly 3 comprises a cap plate 31, an electrode terminal 32 and a connecting piece 33. The cap plate 31 is connected with the case 2 and covers the opening of the case 2, so as to seal the opening of the case 2. The electrode terminal 32 is provided to the cap plate 31, and in some embodiments, the connecting piece 33 is respectively electrically connected with the electrode terminal 32 and the electrode assembly 1 by welding. In a length direction Z, the cap plate 31 and the bottom wall of the case 2 are respectively positioned at two sides of the electrode assembly 1.

The electrode terminal 32 is provided as two in number in some embodiments. One electrode terminal 32 as a positive electrode terminal is electrically connected with the positive electrode plate 111 via one connecting piece 33; the other electrode terminal 32 as a negative electrode terminal is electrically connected with the negative electrode plate 112 via the other connecting piece 33. The cap plate 31 is a metal plate in some embodiments, and the cap plate 31 is electrically connected with the electrode terminal 32 as the positive electrode terminal and insulated from the negative electrode terminal 32. In some embodiments, the case 2 is connected with the cap plate 31 to form a seal by welding or the like.

In known technology, the electrolyte is easy to corrode the case 2, thereby affecting the performance and life of the secondary battery. In the present disclosure, the case 2 is electrically connected with the positive electrode plate 111 via the cap plate 31 and the electrode terminal 32 as the positive electrode terminal, thereby making the case 2 kept at high potential, avoiding electrochemical corrosion, improving the performance and life of the secondary battery.

In the process of assembling the secondary battery, the generated metal foreign materials are easy to sputter and attach to an outer surface of the electrode assembly 1. In the working process, the electrode assembly 1 will expand, and the expansion of the electrode assembly 1 in the thickness direction Y is most serious; when expanding, the electrode assembly 1 will press the first side wall 21; under the influence of pressure, the metal foreign materials attached to the outer surface of the electrode assembly 1 are easy to pierce the separator 113, and conduct the negative electrode active material layer 112d of the negative electrode plate 112 to the first side wall 21; especially, when the secondary battery is in a state of full charge, if the negative electrode active material layer 112d of the negative electrode plate 112 is conducted to the first side wall 21, the electrode assembly 1 will generate heat rapidly inside, thereby leading to safety risk.

Therefore, in some embodiments, the present disclosure provides a first insulating tape 4 on the outer surface of the electrode assembly 1, the first insulating tape 4 is closely attached to the outer surface of the electrode assembly 1 and positioned between the electrode assembly 1 and the first side wall 21. In some embodiments, the first insulating tape 4 is provided as two in number, and the two first insulating tapes 4 are respectively positioned at two ends of the electrode assembly 1 in the thickness direction Y.

Hereinafter a forming process of the secondary battery of the present disclosure will be briefly described:

(i) winding the positive electrode plate 111, the negative electrode plate 112 and the separator 113 together to form the electrode unit 11; bonding the first insulating tape 4 on the surface of the electrode unit 11 after winding;

(ii) stacking a plurality of electrode units 11 together to make the plurality of electrode units 11 form the electrode assembly 1; during stacking, keeping the first insulating tape 4 at an outer side of the electrode assembly 1;

(iii) respectively welding the positive electrode blank region and the negative electrode blank region of the electrode unit 11 to two connecting pieces 33, and then respectively welding the two connecting pieces 33 to the two electrode terminals 32 of the cap assembly 1; and (iv) placing the electrode assembly 1 and the first insulating tape 4 bonding on the electrode assembly 1 into the case 2, and then welding the case 2 with the cap plate 31 of the cap assembly 3 to realize seal of the case 2.

When the number of the electrode units 11 is large, it only needs to bond the first insulating tapes 4 on two electrode units 11 which are outermost in the thickness direction Y; therefore, in step (i), surfaces of a part of the electrode units 11 does not need to bond with the first insulating tapes 4.

In known technology, when welding the electrode terminal and the connecting piece, the metal foreign materials generated by welding are easy to attach on the outer surface of the electrode assembly. In the working process, the electrode assembly expands and presses the case in the later stage of the cycle-life, at this time, the metal foreign materials are easy to pierce the separator of the electrode assembly, and conduct the negative electrode of the electrode assembly to the case, thereby leading to short circuit and resulting in safety risk.

In the present disclosure, before welding the connecting piece 33 to the electrode terminal 32, it bonds the first insulating tape 4 on the outer surface of the electrode assembly 1 firstly; when welding the connecting piece 33 and the electrode terminal 32, the first insulating tape 4 can protect the electrode assembly 1, thereby avoiding the metal foreign materials being directly attached to the outer surface of the electrode assembly 1.

When the electrode assembly 1 expands, the first insulating tape 4 can separate the first side wall 21 and the electrode assembly 1, thereby avoiding the metal foreign materials remained between the first insulating tape 4 and the case 2 piercing the separator 113, preventing the electrical connection between the electrode assembly 1 and the first side wall 21, decreasing the risk of short circuit and improving insulation performance.

If a gap is kept between the first insulating tape 4 and the outer surface of the electrode assembly 1, the metal foreign materials may be remained between the first insulating tape 4 and the electrode assembly 1; when the electrode assembly 1 expands, the metal foreign materials still will pierce the separator 113 easily, even pierce the negative electrode plate 112 and affect the performance of the secondary battery. In the present disclosure, the first insulating tape 4 are closely attached to the outer surface of the electrode assembly 1, so the metal foreign materials almost cannot enter into between the first insulating tape 4 and the electrode assembly 1, thereby avoiding the metal foreign materials piercing the separator 113 and the negative electrode plate 112.

In order to ensure that the lithium-ion of the positive electrode plate 111 can intercalate into the negative electrode plate 112 as far as possible, along the length direction Z parallel to the winding axis of the electrode unit 11, a dimension of the negative electrode active material layer 112d of the negative electrode plate 112 is generally larger than a dimension of the positive electrode active material layer 111d of the positive electrode plate 111. Specifically, referring to FIG. 5, at one end of the electrode assembly 1 in the length direction Z, one end portion 112a of the negative electrode active material layer 112d exceeds one end portion 111a of the positive electrode active material layer 111d; at the other end of the electrode assembly 1 in the length direction Z, the other end portion 112b of the negative electrode active material layer 112d exceeds the other end portion 111b of the positive electrode active material layer 111d. In order to ensure insulation performance, in the length direction Z, a dimension of the separator 113 is generally larger than the dimension of the negative electrode active material layer 112d; specifically, at one end of the electrode assembly 1 in the length direction Z, one end portion 113a of the separator 113 exceeds one end portion 112a of the negative electrode active material layer 112d; at the other end of the electrode assembly 1 in the length direction Z, the other end portion 113b of the separator 113 exceeds the other end portion 112b of the negative electrode active material layer 112d. At this time, in the length direction Z, the separator 113 completely covers the positive electrode active material layer 111d and the negative electrode active material layer 112d.

In some embodiments of the present disclosure, along the length direction Z parallel to the winding axis of the electrode unit 11, an end portion of the first insulating tape 4 exceeds the negative electrode active material layer 112d of the negative electrode plate 112. In other words, at one end of the electrode assembly 1 in the length direction Z, one end portion 4a of the first insulating tape 4 exceeds one end portion 112a of the negative electrode active material layer 112d; at the other end of the electrode assembly 1 in the length direction Z, the other end portion 4b of the first insulating tape 4 exceeds the other end portion 112b of the negative electrode active material layer 112d. At this time, in the length direction Z, the first insulating tape 4 can completely cover the negative electrode active material layer 112d, thereby promoting the insulation performance, decreasing the risk that negative electrode active material layer 112d is conducted to the first side wall 21 to the greatest extent possible, and improving safety performance.

The electrode assembly 1 has two end surfaces 12 disposed opposite to each other in the length direction Z. Specifically, after the electrode assembly 1 is formed by winding, two end portions of the separator 113 in the length direction Z are wound to a plurality of turns, each end portion approximately forms a surface, the surface formed by each end portion is the end surface 12. Fine gaps are kept in the two end surfaces 12, and the electrolyte can flow into the inside of the electrode assembly 1 via the gaps, thereby promoting infiltration capability.

In some embodiments of the present disclosure, in the length direction Z, the end portion of the first insulating tape 4 does not exceed the end surface 12; in other words, in the length direction Z, the first insulating tape 4 is positioned between the two end surfaces 12 of the electrode assembly 1. If the end portion of the first insulating tape 4 exceeds the end surface 12, in the assembling process or using process, a part of the first insulating tape 4 exceeding the end surface 12 is easy to bend to the end surface 12, thereby covering the gaps in the end surface 12, affecting the infiltration capability, and leading to a risk of precipitate of lithium.

The first insulating tape 4 comprises a base body 41 and an adhesive layer 42, the base body 41 is bonded on the outer surface of the electrode assembly 1 via the adhesive layer 42. A material of the base body 41 is flexible polymer in some embodiments, such as PMMA or PET. A material of the adhesive layer 42 is acrylate or ethyl acetate in some embodiments.

In the present disclosure, the base body 41 is directly bonded to the outer surface of the electrode assembly 1 via the adhesive layer 42, and there is no gap between the first insulating tape 4 and the electrode assembly 1, thereby avoiding the metal foreign materials entering into between first insulating tape 4 and the electrode assembly 1. In the present disclosure, although the first insulating tape 4 can avoid the metal foreign materials being attached to the outer surface of the electrode assembly 1, the metal foreign materials still will be attached to an outer surface of the first insulating tape 4, therefore, the first insulating tape 4 needs to have a sufficient thickness, to avoid it being pierced by the metal foreign materials. In addition, the electrode assembly 1 will expand and deform in the using process, so it ensures that the first insulating tape 4 can correspondingly elastically deform with the expansion and contraction of the electrode assembly 1, thereby ensuring the cycle performance and the safety performance of the secondary battery.

In the present disclosure, a thickness of the base body 41 is 10 μm-50 μm, an elastic modulus of the base body 41 is 1 Gpa-6 Gpa.

In the assembling process of the secondary battery, dimensions of the metal foreign materials generated by welding are uneven. When the thickness of the base body 41 is smaller than 10 μm, the metal foreign materials having larger dimensions still may pierce the first insulating tape 4, thereby leading to an electrical connection between the negative electrode plate 112 and the first side wall 21, resulting in a risk of short circuit. When the thickness of the base body 41 is larger than 50 μm, the first insulating tape 4 has a larger volume and occupies more inner space of the case 2. Therefore, by limiting the thickness of the base body 41 to 10 μm-50 μm, it can effectively reduce the risk of short circuit, meanwhile, it also can ensure that the first insulating tape 4 does not excessively occupy the inner space of the case 2. In some embodiments, the thickness of the base body 41 is 12 μm-30 μm.

When the elastic modulus of the base body 41 is smaller than 1 Gpa, the base body 41 is very easy to deform plastically under the influence of expanding pressure, which leads to the thickness of the base body 41 being decreased and the strength of the base body 41 being reduced; at this time, the metal foreign materials may pierce the first insulating tape 4, thereby resulting in the electrical connection between the negative electrode plate 112 and the first side wall 21, and leading to the risk of short circuit. When the elastic modulus of the base body 41 is larger than 6 Gpa, the base body 41 almost cannot be deformed by the expanding pressure, in other words, the base body 41 will limit the expansion of the electrode assembly 1; under the influence of limiting pressure, a part of electrolyte in the electrode assembly 1 will be extruded out, which results in the electrolyte being insufficient, thereby leading to the lithium-ion being unable to pass through the separator 113 and causing the precipitate of lithium. By limiting the elastic modulus of the base body 41 to 1 Gpa-6 Gpa, it can effectively reduce the risk of short circuit, meanwhile, it also can avoid the precipitate of lithium and improve the cycle performance. In some embodiments, the elastic modulus of the base body 41 is 1.2 Gpa-4.5 Gpa.

A thickness of the adhesive layer 42 is 0.5 μm-15 μm. If the thickness of the adhesive layer 42 is smaller than 0.5 μm, the bonding strength of the adhesive layer 42 is lower, which leads to the base body 41 being easily separated from the electrode assembly 1, and results in a failure of the protecting function of the base body 41. If the thickness of the adhesive layer 42 is larger than 15 μm, the adhesive layer 42 will occupy an excessive space, which reduces the energy density of the secondary battery.

When the electrode assembly 1 expands, a stress concentration will be generated between the separator 113 and the adhesive layer 42; in order to avoid the separator 113 being separated from the adhesive layer 42, the bonding strength of the adhesive layer 42 is larger than 0.05 N/mm$^2$ in some embodiments.

Figure 3:
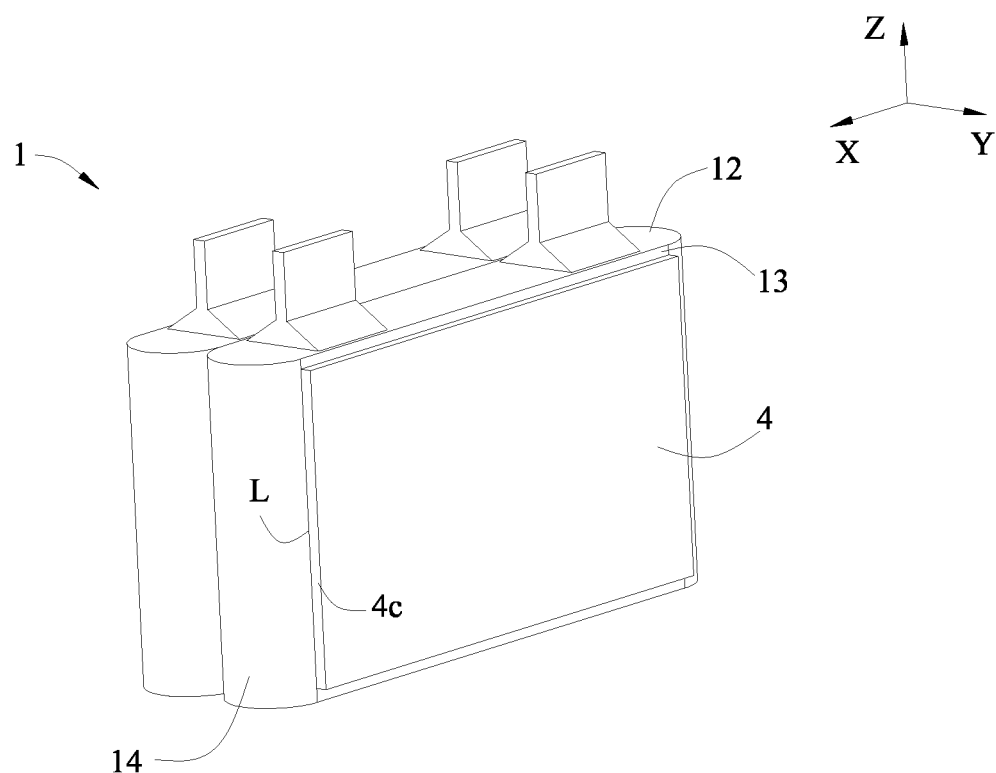
FIG. 3 is a schematic view of an embodiment of an electrode assembly and a first insulating tape of FIG. 2.

Referring to FIG. 3, the outer surface of the electrode assembly 1 comprises two first surfaces 13 and two second surfaces 14. The two first surfaces 13 are basically flat surfaces and respectively positioned at two ends of the electrode assembly 1 in the thickness direction Y, the two second surfaces 14 are respectively positioned at two ends of the electrode assembly 1 in the width direction X. Two ends of each second surface 14 are respectively connected with the two first surfaces 13.

In some embodiments, the electrode units 11 of the electrode assembly 1 are sequentially arranged in the thickness direction Y, so in all the main surfaces 11b of the electrode units 11, one main surface 11b closest to one first side wall 21 is exposed, the other main surface 11b closest to the other first side wall 21 is exposed. The two exposed main surfaces 11b respectively are the two first surfaces 13 of the electrode assembly 1. In addition, the "exposed" is described relative to the electrode assembly 1.

At least a part of the narrow surface 11a is arc surface, so a gap is kept between the narrow surfaces 11a of adjacent electrode units 11, the narrow surface 11a of each electrode unit 11 will not be covered by other electrode units 11, the narrow surfaces 11a of the electrode units 11 are exposed. One second surface 14 comprises the narrow surfaces 11a of each electrode unit 11 at one end of the each electrode unit 11 in the width direction X, the other second surface 14 comprises the narrow surfaces 11a of each electrode unit 11 at the other end of the each electrode unit 11 in the width direction X.

In the present disclosure, the two first surfaces 13 are respectively positioned at two ends of the electrode assembly 1 in the thickness direction Y, and the two second surfaces 14 are respectively positioned at two ends of the electrode assembly 1 in the width direction X; the first surface 13 and the second surface 14 are intersected with each other, so the intersecting position between the first surface 13 and the second surface 14 forms an intersection line L.

The area of the main surface 11b of the electrode unit 11 is larger than the area of narrow surface 11a of the electrode unit 11, so when the electrode unit 11 expands in the using process, the deformation of the main surface 11b of the electrode unit 11 is more serious; in other words, a protruding dimension of the main surface 11b of the electrode unit 11 in the thickness direction Y is larger than a protruding dimension of the narrow surface 11a in the thickness direction Y. Therefore, compared to the second surface 14, the first surface 13 is easier to press the case 2. Furthermore, the first surface 13 is a basically flat surface, the second surface 14 comprises narrow surfaces 11b and at least a part of each narrow surface 11b is arc surface, even if the degree of the deformation of the first surface 13 is same as the degree of the deformation of the second surface 14, compared to a contact area between the second surface 14 and the case 2, a contact area between the first surface 13 and the case 2 is larger. Therefore, compared to the narrow surface 11a, the main surface 11b of the electrode unit 11 has a higher risk of short circuit.

In order to improve the energy density, a gap reserved between the electrode assembly 1 and the case 2 is small, especially a gap between the first surface 13 and the first side wall 21. When the electrode assembly 1 expands, the first surface 13 is easily subjected to a force of the first side wall 21; the second surface 14 is basically in the shape of arc, a larger gap is kept between the second surface 14 and the second side wall 23 and a larger gap is kept between second surface 14 and the first side wall 21, so when the electrode assembly 1 expands, the second surface 14 is not easily subjected to a force of the second side wall 23 and a force of the first side wall 21. Therefore, in some embodiments, the first insulating tape 4 is closely attached to the first surface 13; in other words, the first insulating tape 4 is bonded on the first surface 13. The first insulating tape 4 can separate the first side wall 21 and the first surface 13, thereby avoiding the metal foreign materials piercing the first surface 13, preventing the electrical connection between the negative electrode active material layer 112d and the first side wall 21, and improving the insulation performance.

Referring to FIG. 4, in the width direction X, an edge of the first insulating tape 4 extends to the intersection line L. Specifically, two edges of the first insulating tape 4 in the width direction X respectively are a first edge 4c and a second edge 4d. In the width direction X, the first edge 4c is flush with one intersection line L positioned at one end of the first surface 13, the second edge 4d is flush with the other intersection line L positioned at the other end of the first surface 13. At this time, in the width direction X, the first insulating tape 4 can separate the first side wall 21 and the negative electrode plate 112 completely, thereby avoiding the electrical connection between the first side wall 21 and the negative electrode plate 112, and improving the insulation performance.

A region of the first surface 13 not covered by the first insulating tape 4 still has a risk of being pierced by the metal foreign materials, so in order to ensure the insulation performance, a ratio of an area of the first insulating tape 4 to an area of the first surface 13 is 75%-95%. If the ratio is larger than 95%, when bonding the first insulating tape 4, the first insulating tape 4 is easy to be misplaced, which leads to the first insulating tape 4 exceeding the end surface 12, affects the infiltration capability, and results in the risk of the precipitate of lithium.

In order to further improve the insulation performance and avoid the first insulating tape 4 being damaged in the process of positioning the first insulating tape 4 into the case 2, the secondary battery further comprises a protecting member 6 positioned in the case 2, the protecting member 6 can surround the electrode assembly 1 and the first insulating tape 4, so as to separate the electrode assembly 1 and the case 2 and separate the first insulating tape 4 and the case 2. A basically rectangle cavity is formed by the protecting member 6, and the electrode assembly 1 and the first insulating tape 4 are received in the cavity and surrounded by the protecting member 6. Specifically, in step (iv), it winds the protecting member 6 around the electrode assembly 1 and the first insulating tape 4 firstly, and then positions the protecting member 6, the electrode assembly 1 and the first insulating tape 4 into the case 2 together, and welds the case 2 to the cap plate 31 of the cap assembly 3 in the end, thereby realizing the seal of the case 2.

Figure 7:
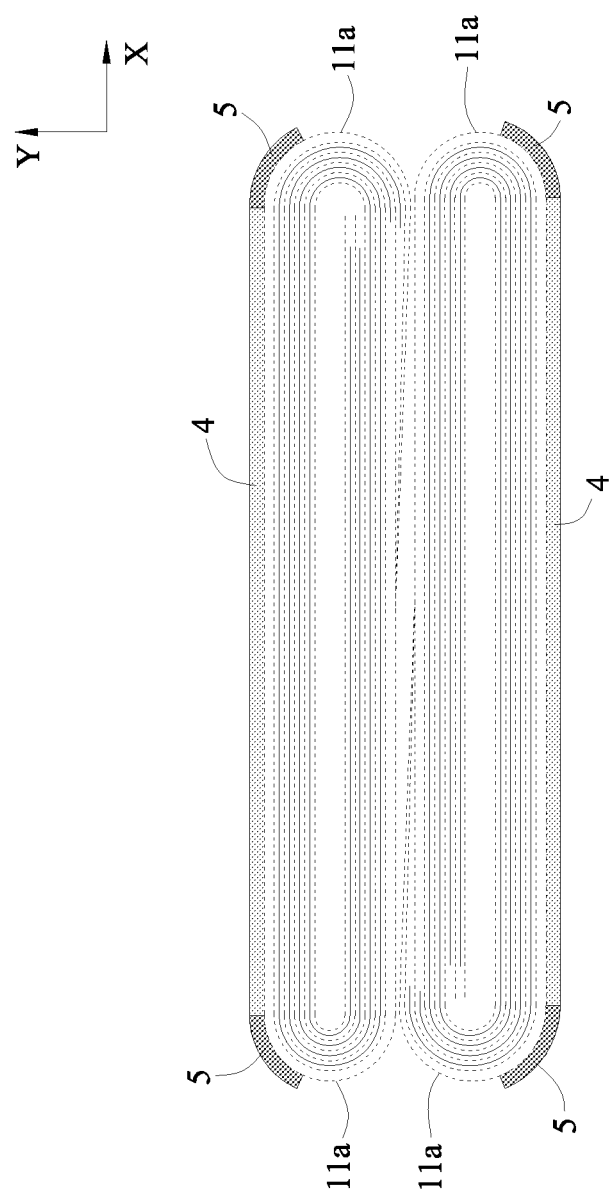
FIG. 7 is a schematic view of another embodiment of an electrode assembly and a first insulating tape of FIG. 2.

Referring to FIG. 7, in some alternative embodiments, the secondary battery further comprises a second insulating tape 5, at least a part of the second insulating tape 5 is closely attached to the second surface 14, and the second insulating tape 5 is connected with the first insulating tape 4. The first insulating tape 4 and the second insulating tape 5 are integrally formed in some embodiments. If there is no second insulating tape 5, when bonding the first insulating tape 4, it needs to ensure that the first edge 4c is flush with one intersection line L and the second edge 4d is flush with the other intersection line L, which has a higher requirement of process precision. By providing the second insulating tape 5, it allows misplacement between the first edge 4c and the intersection line L, as long as it can ensure that the intersection line L is covered by the first insulating tape 4 or the second insulating tape 5, thereby simplifying bonding process of the insulating tape.

Furthermore, the embodiments of the present disclosure further provide an apparatus, which includes a secondary battery according to any one of the embodiments as described above, wherein the secondary battery is adapted to provide power for the apparatus. The apparatus may be an electric vehicle, a hybrid vehicle, an electric scooter, an electric cart or any other suitable devices which can include the battery pack as their own power source.

What is claimed is:

1. A secondary battery, comprising an electrode assembly, a case, a cap assembly and a pair of first insulating tapes;
    the electrode assembly comprising a stack of electrode units arranged along a thickness direction of the electrode units;
    each electrode unit comprising a positive electrode plate, a negative electrode plate and a separator provided between the positive electrode plate and the negative electrode plate;
    the electrode unit being a winding structure and in a flat shape, and an outermost turn of the negative electrode plate being positioned at an outer side of an outermost turn of the positive electrode plate;

the case comprising a pair of first side walls and a pair of second side walls collectively defining an accommodating cavity, the electrode assembly being accommodated in the accommodating cavity, the case being electrically connected with the positive electrode plate, and the cap assembly being connected with the case;

each first insulating tape of the pair of first insulating tapes being positioned between the electrode assembly and a corresponding first side wall and closely attached to an outer surface of a corresponding outermost one of the stack of electrode units in the electrode assembly;

the each first insulating tape of the pair of first insulating tapes being separated from the outermost turn of the negative electrode plate of the corresponding outermost one of the stack of electrode units by at least two separator layers;

the at least two separator layers being longer than the negative electrode plate and the negative electrode plate being longer than the positive electrode plate along a length direction parallel to a winding axis of the stack of electrode units; and the each first insulating tape of the pair of first insulating tapes being shorter than the at least two separator layers and being longer than the negative electrode plate along the length direction parallel to the winding axis of the stack of electrode units.

2. The secondary battery according to claim 1, wherein the negative electrode plate comprises a negative electrode current collector and a negative electrode active material layer coated on two surfaces of the negative electrode current collector.

3. The secondary battery according to claim 1, wherein the first insulating tape comprises a base body and an adhesive layer, the base body is bonded on the outer surface of the electrode assembly via the adhesive layer.

4. The secondary battery according to claim 3, wherein a thickness of the base body is 10 μm-50 μm, and an elastic modulus of the base body is 1 Gpa-6 Gpa.

5. The secondary battery according to claim 3, wherein a thickness of the adhesive layer is 0.5 μm-15 μm, and a bonding strength of the adhesive layer is larger than 0.05 N/mm².

6. The secondary battery according to claim 1, wherein the secondary battery further comprises a protecting member positioned in the case, the protecting member separates the electrode assembly and the case and separates the first insulating tape and the case.

7. The secondary battery according to claim 1, wherein the outer surface of the electrode assembly comprises a first surface and a second surface, the first surface is a flat surface and positioned at an end of the electrode assembly in a thickness direction, the second surface is connected with the first surface and positioned at an end of the electrode assembly in a width direction;

the first side wall is positioned at a side of the electrode assembly close to the first surface in the thickness direction, the first insulating tape is positioned between the first surface and the first side wall.

8. The secondary battery according to claim 7, wherein the secondary battery further comprises a second insulating tape, at least a part of the second insulating tape is closely attached to the second surface, and the second insulating tape and the first insulating tape are integrally formed.

9. The secondary battery according to claim 7, wherein a ratio of an area of the first insulating tape to an area of the first surface is 75%-95%.

10. The secondary battery according to claim 7, wherein the electrode unit is provided as plurality in number, and the plurality of electrode units are arranged in the thickness direction;

each electrode unit has a narrow surface at an end in the width direction;

the second surface comprises the narrow surface of each electrode unit.

11. The secondary battery according to claim 10, wherein at least a part of the narrow surface is arc surface.

12. The secondary battery according to claim 7, wherein the first surface and the second surface are intersected with each other, and an intersecting position between each first surface and each second surface forms an intersection line;

the first insulating tape comprises a first edge and a second edge in the width direction;

in the width direction, the first edge is flush with one intersection line positioned at one end of the first surface, the second edge is flush with the other intersection line positioned at the other end of the first surface.

13. The secondary battery according to claim 1, wherein the cap assembly comprises a cap plate, an electrode terminal and a connecting piece, the cap plate is connected with the case and covers an opening of the case, the electrode terminal is provided to the cap plate, and the connecting piece connects the electrode terminal and the electrode assembly.

14. The secondary battery according to claim 13, wherein the electrode terminal is provided as two in number;

one electrode terminal is electrically connected with the positive electrode plate and the cap plate, the other electrode terminal is electrically connected with the negative electrode plate and insulated from the cap plate.

15. The secondary battery according to claim 2, wherein in the length direction, a dimension of the separator is larger than a dimension of the negative electrode active material layer.

16. The secondary battery according to claim 15, wherein the positive electrode plate comprises a positive electrode current collector and a positive electrode active material layer coated on two surfaces of the positive electrode current collector;

in the length direction, a dimension of the negative electrode active material layer is larger than a dimension of the positive electrode active material layer.

17. The secondary battery according to claim 1, wherein an outermost turn of the separator of the electrode unit is positioned at an outer side of the outermost turn of the negative electrode plate.

18. The secondary battery according to claim 1, wherein the first insulating tape is provided as two in number, and the two first insulating tapes are respectively positioned at two ends of the electrode assembly in a thickness direction.

19. An apparatus, comprising a secondary battery according to claim 1, wherein the secondary battery is adapted to provide power for the apparatus.

* * * * *